United States Patent Office 2,694,620
Patented Nov. 16, 1954

2,694,620

RECOVERY OF MAGNESIA

Frank E. Lathe, Ottawa, Ontario, Canada, assignor to Canadian Refractories Limited, Montreal, Quebec, Canada, a corporation of Canada No Drawing. Application June 2, 1951,
Serial No. 229,651

8 Claims. (Cl. 23—201)

This invention relates to the separation and recovery of magnesia from certain other oxides associated therewith in naturally occurring deposits, and especially from silica and lime.

Magnesia is a base occurring widely in nature, in many types of sedimentary and igneous rocks, relatively few of which, however, are economical sources of this oxide. Magnesium in the form of a soluble salt occurs in sea water, in the water of certain inland seas and lakes, and in some natural brines and saline deposits, but frequently in concentrations so low that separation and recovery of magnesia are unduly expensive.

The naturally occurring carbonate of magnesium, magnesite, is found in many parts of the world, frequently in association with dolomite, a double carbonate of calcium and magnesium, and with silicates of magnesium such as olivine, serpentine and diopside. The principal object of this invention is to provide a method of recovering magnesia of commercial grade from relatively low-grade natural deposits in which magnesium carbonate is associated with lime or silica, and usually both of these impurities.

A further object is to provide a method of treating rock containing mixed magnesite and dolomite for the recovery therefrom of magnesia with a minimum content of free lime, which is objectionable in certain applications, whereas lime combined as carbonate is not, at least to the same degree.

Another object is to obtain magnesia in a form which is particularly suitable for the production of refractories, for the manufacture of oxychloride cement and magnesia insulation materials, for use in admixture with other plant foods as fertilizer, for the recovery of metallic magnesium and for the manufacture of a wide variety of chemicals.

A specific object of the invention is to provide a method wherein the calcination of the natural material and the separation and removal of the magnesia are performed in a single unitary step, thus substantially reducing the cost of operation, at the same time improving the efficiency of the separation, and providing a plurality of products directly available for commercial use.

Rock suitable for treatment by this method usually contains not only magnesium carbonate in the form of magnesite but also, in admixture therewith, calcium carbonate or the double carbonate of magnesium and calcium, dolomite, and frequently silica or silicates. The rock is first prepared for treatment by crushing it at least to one-quarter inch size, and usually until substantially all will pass a screen of six or eight meshes to the linear inch, from which by air separation or screening the small fraction passing 48 or 65 mesh is preferably removed. The particles passing about 8 mesh but retained on 65 mesh are then calcined at a temperature in the range 1100 to 1500° F. in order to expel carbon dioxide from the magnesite—and if desired from the magnesium carbonate constituent of the dolomite—without appreciably decomposing the calcium carbonate or greatly changing the physical character of the silica or silicates, thereby producing light, friable magnesia, the while maintaining the material being calcined in a fluidized or fluid-like state by passing gas upwardly between the particles to cause attrition and selectively reduce the friable magnesia to a fine, light powder, substantially all finer than 0.01 inch, and at the same time to lift this light powder and selectively remove it to a collector, leaving behind in the calcining unit the greater portion of the coarser and heavier calcium carbonate and silica or silicates for concurrent or subsequent removal by gravity from the calcining furnace, as a separate product.

It is known that a limited degree of success has been previously attained (Lathe and Stewart, Canadian Patent 278,774) in the selective calcination, light crushing and separation of the constituents of carbonate rocks of the type described above, but by comparison with the present invention the method was not very satisfactory. Calcination was carried out in a rotary kiln, using a coarser rock and a much higher proportion of fuel. Because of the exposure of the rock to high flame temperatures, some of the calcium carbonate was always decomposed on the surface of the pieces of rock, producing free lime, while the interior portions of the larger pieces were insufficiently heated. As a result of the mechanical action caused by rotation of the kiln and downward travel of the charge, some even of the harder portions of the charge were crushed along with the softer magnesia. The major difficulty, however, arose in the subsequent crushing of the calcines, which by any ordinary method were broken down with insufficient selectivity. Thus when a positive crushing method was used, both hard and soft portions were disintegrated, whereas when the material was lightly crushed in a ball mill without ball charge most of the larger particles were worn down on their surfaces without being broken open, and most of the eroded material was reduced to a fine powder, with only partial selective action. Separation was effected by screening, strictly according to size, thereby taking no advantage of the fact that the magnesia, being highly porous, was of much lower particle density than the dolomite and silicates.

In summary, the capital cost was high because of the necessity of providing for three successive operations, and operating costs were high because of the relatively high fuel consumption and the amount of labour and supervision required. The separation being relatively inefficient, the magnesia produced was undesirably high in total lime and silica and in free lime. While some commercial application resulted, these limitations of the method effectively prevented any large-scale development.

By contrast, the present method uses a fluidized bed of small particles in the calcining operation, thereby economizing on fuel, facilitating temperature control and almost completely preventing—or adequately controlling—the decomposition of the dolomite. By maintaining the rate of upward movement of the gas within desired limits, attrition of the particles is made highly selective, and the very fine particles of magnesia resulting are preferentially removed by the gas stream because of both their low density and their minute size. The three operations of calcining, attrition and separation are thus carried out as a single step in a single unit, one which has a large capacity for its size and requires a minimum of fuel. Further, the fine magnesia removed is suitable for many applications without further grinding or other treatment, and can often be bagged directly from the dust collectors.

It is well known that magnesium carbonate and calcium carbonate decompose at temperatures which differ considerably, and that dolomite breaks up into its component carbonate molecules at an intermediate temperature. The actual temperatures of decomposition vary somewhat with the percentage of carbon dioxide in the surrounding gases, increasing with the partial pressure of the carbon dioxide. In practice, however, it is easy to control the temperature of a fluidized bed within very narrow limits, and almost any desired results can be obtained. Below 1100° F. decomposition is limited to the magnesite constituent, but it takes place so slowly as to be of no commercial interest. Between 1150 and about 1325° F. the rate of decomposition of magnesite is reasonably satisfactory and dolomite is almost unaffected, while in the range 1350 to 1450° F. the magnesite is decomposed, the bond between the magnesium carbonate and calcium carbonate of the dolomite is broken and the former also loses its carbon dioxide, thereby making available a maximum amount of chemically active magnesia, without, however, the formation of appreciable free lime. Temperatures above 1525 to 1550° F. are not ordinarily used when much calcium carbonate is present, since the amount of free lime in the magnesia product may be too high to be acceptable for general application, although when free lime is permissible the temperature may be carried to 1650 and there can then be obtained a higher yield of a product of lower grade. In general, the separation of silica is not adversely affected by calcination at a high temperature, and, in the absence of much lime or when only silica is to be separated, temperatures between 1400 and 2000° F. may advantageously be used. The above decomposition temperatures do not correspond closely with those given in the literature, but they are the practical temperatures as actually determined in operation with a fluidized bed.

The optimum size of rock is largely governed by the conditions necessary for good fluidization. Rock which will not pass through a 4-mesh screen does not fluidize readily, and even at 4 mesh a high rate of gas travel is necessary to keep it suspended. Further, under these conditions attrition is too great for most magnesites, and the recovered magnesia is likely to be contaminated with too much lime and silica. Rock passing a screen of 6 to 8 meshes per linear inch is generally satisfactory, and finer sizes, down to about 20 mesh, have been found to give good results. In most cases, it is preferable to have the finest material removed before calcination, as noted above, but not that of intermediate size. In explanation it may be said that very fine rock, if not previously removed, would at high gas velocities be blown out of the system and hence contaminate the magnesia product. Further, were the rock particles all of one size the charge would be too open, and fluidization would be difficult. These reasons explain, at least in part, why good separations can be secured with such sizes as —6+48, —10+65 and —20+100 mesh.

The optimum velocity of gas through the fluidized bed depends both on the particle size of the rock used and on the degree of attrition desired. There is of course a minimum velocity below which fluidization will not occur, and the actual velocity must always be somewhat above this rate. Still higher velocities will be used if required to effect a greater degree of attrition. Over the range of sizes used in the method described, the limits of the permissible velocity range are about 1.2 and 5.0 linear feet per second for the finer and coarser sizes, respectively, and the actual velocity within this range to be used for any particular rock is best determined by experiment. These gas velocities are calculated for the volumes at the temperatures used in calcination, and on the assumption that no solid particles are present; the actual velocity between the particles in any case is of course substantially higher, but it is not readily susceptible to determination.

The method was first tried in experiments carried out on —10+65 mesh carbonate rock of different types, but all containing magnesite, dolomite and serpentine as their principal mineral constituents. Tests were run at several temperatures, at various gas velocities, and on material of several different sizes, in order to determine what effect these changes in conditions would have on (1) the degree of calcination, (2) the amount of attrition occurring, (3) the yield and (4) the purity of the products.

Three products were made: (1) a coarse, relatively low-grade product, removed by gravity, (2) a product consisting of fines resulting from attrition, carried away in the gas stream and recovered in a cyclone collector, and (3) a still finer material which passed through the cyclone with the gases but was recovered by a filter.

Some of the results are shown in Table I. In order to permit comparison of the original rock and the products, no two of which contained the same amount of carbon dioxide, the magnesia, lime, silica and weight percentages have been calculated to zero volatile content, that is, to complete freedom from carbon dioxide and combined water. The figures for loss on ignition are those obtained on the samples as taken.

In the first three runs the same type of rock was used. Analysis shows that in the first run, at 1120° F., not all of the magnesite was decomposed; there was the least attrition, and the recovery of the product high in magnesia was the lowest, at 21.8%. Following calcination at 1210° F., recovery was 41.7%, and at 1395° F., it was 46.6%, showing that 1120° F. is considerably below the optimum for this rock. It is remarkable that, in spite of temperature and gas velocity variation, all tests gave a magnesia content of the fines, on the loss-free basis, of 87-89%, lime of 8.5-9.9% and silica of 0.69-1.13%, while even the free lime was less than 1.0% in all cases, and nearly constant.

The loss on ignition of all samples has been shown, to indicate roughly the degree of decomposition that has taken place, but the relation is by no means close, since in the cyclone and filter there is opportunity for partial recarbonation from the carbon dioxide of the gases, and also—at the lower temperatures—for hydration by moisture formed from the oxidation of hydrogen introduced in the fuel used. It is nevertheless clear that, in general, the coarse products have had a smaller loss of carbon dioxide than have the finer products. This naturally results from both selective calcination of the magnesite constituent and selective attrition of the magnesia so formed.

In runs 4–7, also carried out on rock feed containing magnesite, dolomite and serpentine, but considerably less dolomite than the feed for runs 1–3, the temperature was varied over a still wider range. In general, recoveries were lower than in earlier runs, but the products obtained were of considerably higher grade. It will be observed that even at 1650° F. the fine products were substantially as free from silica as at all lower temperatures, though the lime content was higher, as is to be expected. The free lime was low even at 1500° F., but at 1650° most of the calcium carbonate in all three products was decomposed, since 1650° closely approaches the temperature at which calcium carbonate breaks up, even in an atmosphere of pure carbon dioxide.

It will be appreciated that, when working with a particular type of rock, the temperature, feed rate and other conditions may readily be controlled so as to produce almost any desired degree of calcination. Thus one can at a low temperature calcine rock containing both magnesite and dolomite so as to decompose substantially all of the magnesite but little or none of the dolomite, or, if desired, at a somewhat higher temperature, to decompose substantially all of the magnesite and magnesium carbonate constituent of the dolomite but little or none of the calcium carbonate constituent. While the specific conditions for such results may vary appreciably with the particular rock being treated, they are readily determined by trial.

TABLE I

*Effect of temperature variations of separation of magnesia*

| Run No. | Mesh Size | Temp., deg. F. | Gas Velocity,[1] ft./sec. | Material | Loss on Ignition | Free CaO | On Loss-free basis | | | |
|---|---|---|---|---|---|---|---|---|---|---|
| | | | | | | | Wt. Percent | MgO | CaO | SiO$_2$ |
| 1 | —10+65 | 1,120 | 1.7 | Raw Rock | 48.00 | None | 100.0 | 72.50 | 21.82 | 4.14 |
| | | | | Coarse Prod | 29.65 | 0.60 | 78.2 | 68.24 | 25.17 | 4.49 |
| | | | | Cyclone Prod | 17.59 | 0.60 | 20.5 | 87.22 | 9.85 | 0.75 |
| | | | | Filter Prod | 15.03 | 0.78 | 1.3 | 86.24 | 9.68 | 1.22 |
| | | | | Recovery | | 0.61 | 21.8 | 87.16 | 9.84 | 0.78 |
| 2 | —10+65 | 1,210 | 2.3 | Raw Rock | 48.00 | None | 100.0 | 72.50 | 21.82 | 4.14 |
| | | | | Coarse Prod | 29.91 | 0.36 | 58.3 | 61.23 | 30.38 | 5.30 |
| | | | | Cyclone Prod | 18.43 | 0.12 | 36.2 | 87.02 | 9.93 | 1.20 |
| | | | | Filter Prod | 15.96 | 0.36 | 5.5 | 87.00 | 9.14 | 1.33 |
| | | | | Recovery | | 0.15 | 41.7 | 87.02 | 9.82 | 1.22 |

See footnote on end of table.

TABLE I—Continued

| Run No. | Mesh Size | Temp., deg. F. | Gas Velocity,[1] ft./sec. | Material | Loss on Ignition | Free CaO | On Loss-free basis | | | |
|---|---|---|---|---|---|---|---|---|---|---|
| | | | | | | | Wt. Percent | MgO | CaO | $SiO_2$ |
| 3 | −10+65 | 1,395 | 2.4 | Raw Rock | 48.00 | None | 100.0 | 72.50 | 21.82 | 4.14 |
| | | | | Coarse Prod | 27.55 | 0.96 | 53.4 | 57.43 | 33.44 | 6.19 |
| | | | | Cyclone Prod | 11.92 | 0.54 | 43.6 | 89.29 | 8.51 | 0.68 |
| | | | | Filter Prod | 12.06 | 1.08 | 3.0 | 88.74 | 8.26 | 0.77 |
| | | | | Recovery | | 0.55 | 46.6 | 89.26 | 8.45 | 0.69 |
| 4 | −10+65 | 1,250 | 1.8 | Raw Rock | 47.55 | None | 100.0 | 87.55 | 8.20 | 3.25 |
| | | | | Coarse Prod | 14.20 | 0.48 | 87.8 | 85.01 | 8.85 | 5.14 |
| | | | | Cyclone Prod | 6.60 | 0.48 | 11.5 | 94.37 | 3.20 | 1.43 |
| | | | | Filter Prod | 9.40 | 0.90 | 0.6 | 92.95 | 3.85 | 2.20 |
| | | | | Recovery | | 0.50 | 12.1 | 94.30 | 3.23 | 1.47 |
| 5 | −10+65 | 1,400 | 1.7 | Raw Rock | 47.55 | None | 100.0 | 85.80 | 8.75 | 4.45 |
| | | | | Coarse Prod | 10.55 | 1.08 | 76.2 | 83.24 | 10.70 | 5.06 |
| | | | | Cyclone Prod | 4.60 | 0.60 | 22.7 | 95.35 | 2.65 | 1.00 |
| | | | | Filter Prod | 7.00 | 0.66 | 1.1 | 94.35 | 2.75 | 1.90 |
| | | | | Recovery | | 0.60 | 23.8 | 95.30 | 2.66 | 1.04 |
| 6 | −10+65 | 1,500 | 1.7 | Raw Rock | 47.55 | None | 100.0 | 85.45 | 9.40 | 4.15 |
| | | | | Coarse Prod | 10.40 | 0.72 | 65.7 | 79.52 | 12.95 | 6.53 |
| | | | | Cyclone Prod | 4.15 | 1.20 | 33.0 | 95.50 | 2.60 | 0.90 |
| | | | | Filter Prod | 4.90 | 1.80 | 1.3 | 95.01 | 2.55 | 1.44 |
| | | | | Recovery | | | 34.3 | 95.48 | 2.60 | 0.92 |
| 7 | −10+65 | 1,650 | 1.7 | Raw Rock | 47.55 | None | 100.0 | 83.10 | 11.55 | 4.35 |
| | | | | Coarse Prod | 2.35 | 12.00 | 64.5 | 78.18 | 14.80 | 6.02 |
| | | | | Cyclone Prod | 2.45 | 3.96 | 33.8 | 92.32 | 5.70 | 0.98 |
| | | | | Filter Prod | 2.90 | 4.92 | 1.7 | 91.34 | 5.80 | 1.86 |
| | | | | Recovery | | | 35.5 | 92.27 | 5.70 | 1.02 |

[1] Assuming no solids present.

The nature of the physical separation effected by the treatment described is shown in Table II, in which are given screen analyses of the rock feed used in runs 1 and 3, and also of the products obtained in those tests.

TABLE II

*Screen analyses of rock feed and products*

| Tyler Screen Size | Rock Feed | Run 1, 1.7 ft./sec. | | | Run 3, 2.4 ft./sec. | | |
|---|---|---|---|---|---|---|---|
| | | Coarse Product | Cyclone Product | Filter Product | Coarse Product | Cyclone Product | Filter Product |
| −10+14 | 21.4 | 7.1 | | | 10.3 | | |
| −14+20 | 23.9 | 14.4 | | | 16.9 | | |
| −20+28 | 18.7 | 15.5 | | | 16.5 | | |
| −28+35 | 12.2 | 13.7 | | | 12.4 | | |
| −35+48 | 10.2 | 14.3 | | | 12.5 | | |
| −48+65 | 8.4 | 14.9 | | | 12.4 | None | |
| −65+100 | 4.5 | 11.5 | None | | 11.0 | 1.4 | |
| −100+200 | | 7.3 | 27.9 | None | 7.0 | 32.7 | None |
| Pan | 0.7 | 1.3 | 72.1 | 100.0 | 1.0 | 65.9 | 100.0 |

Comparing the screen analyses of the raw rock and coarse calcined products, it will be observed that the latter were considerably finer in both runs. It might be supposed that this was caused by decrepitation of the coarser particles, but repeated tests have shown that the rock feed used in all of the tests reported herein does not appreciably decrepitate when particles of the size range under consideration are rapidly heated. Rather, reduction in particle size is the natural result of the calcination and attrition of rock particles in which there coexist two or more minerals, such as (a) magnesite and serpentine, (b) dolomite and quartz, or (c) magnesite, dolomite and diopside, in each of which cases particle size is reduced by selective attrition of the friable portion that has resulted from calcination.

The two cyclone products contained very little material coarser than 100 mesh, indicating that the separation according to particle size is highly selective. It will be observed that in run 3 the cyclone product was appreciably coarser than that of run 1. This is the effect of the higher gas velocity used, and is an illustration of how the character of the products may be varied by varying the gas velocity.

It is also important to note that the higher temperatures and gas velocity have brought about a greater degree of attrition of the particles in run 3 than in run 1, the quantities carried over with the gases being (on the loss-free basis) as 46.6 and 21.8% of the total, respectively (Table I). That this has not resulted from greater breakdown of the dolomite and silicates, but of magnesite, is seen from the higher proportion of −10+28 mesh in run 3 (43.7 compared with 37.0%), the higher lime and silica content of the coarse fraction and the higher magnesia content of the fines (Table I).

It is also of interest to observe that the filter products were so fine as to wholly pass a 200-mesh screen. In chemical composition they were in all runs very similar to the cyclone products, showing that appreciable selectivity in crushing did not extend to these finer particle sizes. This is not surprising, since all particles tend to be carried out in the gas stream as soon as they are fine enough to be lifted at the gas velocity prevailing. In some instances, products high in magnesia and of exceptional fineness are of special value in particular applications, and may be marketed separately, but the cyclone and filter products will normally be combined.

The effect of changes in particle size of the fluidized rock is shown in Table III, the range being from −20+65 to −6+48 mesh. Percentage recoveries and analyses of the products are surprisingly alike, indicating that, within this range, particle size is not a major factor. As mentioned above, however, it is important to have a range of sizes in each case which will permit good fluidization at the gas velocity used.

TABLE III

*Effect of particle size on separation of magnesia*

| Run No. | Mesh Size | Temp., deg. F. | Gas Velocity, ft./sec. | Material | Loss on Ignition | On Loss-free Basis | | | |
|---|---|---|---|---|---|---|---|---|---|
| | | | | | | Wt. Percent | MgO | CaO | SiO$_2$ |
| 8 | −20+65 | 1,500 | 3.3 | Raw Rock | 42.45 | 100.0 | 68.35 | 22.70 | 7.45 |
| | | | | Coarse Prod | 18.20 | 53.3 | 54.19 | 30.50 | 13.81 |
| | | | | Cyclone Prod | 12.75 | 46.1 | 82.20 | 13.80 | 2.50 |
| | | | | Filter Prod | 8.95 | 0.6 | 80.55 | 14.75 | 3.20 |
| | | | | Recovery | | 46.7 | 82.18 | 13.81 | 2.51 |
| 9 | −10+65 | 1,500 | 3.2 | Raw Rock | 42.50 | 100.0 | 67.85 | 23.55 | 7.10 |
| | | | | Coarse Prod | 20.70 | 58.0 | 55.16 | 30.75 | 12.59 |
| | | | | Cyclone Prod | 13.55 | 41.4 | 82.78 | 13.65 | 2.07 |
| | | | | Filter Prod | 9.45 | 0.6 | 82.84 | 11.75 | 3.91 |
| | | | | Recovery | | 42.0 | 82.78 | 13.62 | 2.10 |
| 10 | −6+48 | 1,500 | 3.4 | Raw Rock | 43.00 | 100.0 | 68.50 | 23.80 | 6.20 |
| | | | | Coarse Prod | 17.20 | 44.9 | 50.57 | 34.75 | 13.18 |
| | | | | Cyclone Prod | 12.75 | 54.6 | 80.91 | 15.20 | 2.39 |
| | | | | Filter Prod | 8.80 | 0.5 | 77.22 | 17.30 | 3.98 |
| | | | | Recovery | | 55.1 | 80.88 | 15.22 | 2.40 |

The effect of gas velocity is considerable, as shown in Table IV. The major effect is upon the percentage recovery, but this results from both the greater amount of attrition brought about and the fact that larger particles are carried out of the fluidized bed at the higher velocities. For the same reasons, the quality of the high magnesia products tends to fall off at the higher velocities, but in this case the effect is less marked. The actual velocity to be used in practice will therefore depend in the main upon the relative importance of yield and quality.

extremely high. Further, in treating still more impure rock, very high in lime and silica, it is possible to obtain products entirely suitable for the manufacture of quick-setting materials for open hearth steel furnace bottoms and certain types of refractory brick.

For the manufacture of oxychloride cement one uses "caustic calcined" magnesia, which need not, however, be very high in magnesia; the free lime content should be low. In this respect any of the coarse or fine products of runs 1-6 would be satisfactory and the fine products

TABLE IV

*Effect of gas velocity on separation of magnesia*

| Run No. | Mesh Size | Temp., deg. F. | Gas Velocity, ft./sec. | Material | Loss on Ignition | On Loss-free Basis | | | |
|---|---|---|---|---|---|---|---|---|---|
| | | | | | | Wt. Percent | MgO | CaO | SiO$_2$ |
| 11 | −10+65 | 1,500 | 1.7 | Raw Rock | 42.50 | 100.0 | 70.20 | 21.95 | 6.35 |
| | | | | Coarse Prod | 17.05 | 71.8 | 61.87 | 27.00 | 9.63 |
| | | | | Cyclone Prod | 5.95 | 26.4 | 88.19 | 9.05 | 1.26 |
| | | | | Filter Prod | 8.85 | 1.8 | 86.70 | 9.20 | 2.60 |
| | | | | Recovery | | 28.2 | 88.09 | 9.06 | 1.35 |
| 12 | −6+48 | 1,500 | 2.6 | Raw Rock | 43.90 | 100.0 | 66.30 | 24.15 | 8.05 |
| | | | | Coarse Prod | 17.70 | 50.6 | 49.44 | 34.75 | 14.31 |
| | | | | Cyclone Prod | 12.60 | 48.3 | 81.84 | 14.60 | 2.16 |
| | | | | Filter Prod | 9.50 | 1.1 | 79.19 | 14.75 | 4.56 |
| | | | | Recovery | | 49.4 | 81.76 | 14.51 | 2.21 |
| 10 | −6+48 | 1,500 | 3.4 | Raw Rock | 43.90 | 100.0 | 68.50 | 23.80 | 6.20 |
| | | | | Coarse Prod | 17.20 | 44.9 | 50.57 | 34.75 | 13.18 |
| | | | | Cyclone Prod | 12.75 | 54.6 | 80.91 | 15.20 | 2.39 |
| | | | | Filter Prod | 8.80 | 0.5 | 77.22 | 17.30 | 3.98 |
| | | | | Recovery | | 55.1 | 80.88 | 15.22 | 2.40 |

It is of interest to note that the method of the invention provides a number of products which are particularly suitable for a variety of commercial uses.

In the production of basic refractories it is desirable in most cases to use raw materials high in magnesia and relatively low in lime, at the same time maintaining a ratio of lime to silica at least equal to that of dicalcium silicate (1.867). It will be observed from Table I that runs 4-6 all produced cyclone and filter products of this type, the magnesia being 94 to 96% and the ratio of lime to silicate of the combined fine products being at least up to the desired standard. Even in runs 1-3, in which the feed was high in lime, the magnesia content of the products was close to 90% and the ratio of lime to silica was could in fact be bagged for such a use without fine grinding or other treatment. All of these products would similarly be acceptable for addition to fertilizers as sources of magnesia and for the manufacture of insulation products, such as that known commercially as "85% magnesia."

For the manufacture of metallic magnesium and chemicals, materials high in magnesia and low in lime and silica are also desirable, and here again the fine products of runs 4-6 are acceptable. The exceptional fineness of the filter product makes it of special value in applications where a very fine state of division is required. In certain cases, therefore, it is advantageous to recover, and market separately, the coarse, cyclone and filter products.

Further, for use as agricultural lime the coarse products of all runs, with the possible exception of run 7 at 1650° F., are particularly suitable, as they are so porous that they do not require fine grinding, the contained magnesium silicate is rendered more soluble by calcination in a fluidized condition, and the free lime content is low enough that an overdosage and burning are unlikely.

Obviously, calcination in a fluidized condition and concurrent selective attrition and air separation can take place in equipment varying greatly in design, provided only that the sizes of the particles, the velocities of gas flow and the temperatures are suitable, as described above. I do not claim any particular type of equipment, but what I do claim is:

I claim:

1. A method of obtaining magnesium oxide from natural rock containing an intimate mixture of magnesite and at least one of the commonly associated impurities, dolomite, calcium carbonate, silica and silicates, which comprises crushing the rock until it will substantially all pass a screen of four meshes to the linear inch but be retained on a screen of 65 meshes to the linear inch, selectively calcining the granular rock at a temperature exceeding 1100° F. but not exceeding 2000° F. to expel carbon dioxide from the magnesium carbonate without greatly changing the physical character of silica and silicates present, thereby producing light, friable magnesia, the while maintaining the material being calcined in a near-fluid state by passing gas upwardly between its particles to cause attrition and selectively reduce the friable magnesia to a fine, light powder, and thereby also to selectively lift said fine, light powder in the gas stream and convey it therein to a collector, collecting the magnesia so conveyed as a dust substantially all finer than 0.01 inch, leaving behind in the calcining zone the coarser and heavier impurities and removing these by gravity from the calcining zone as a separate product.

2. A method as defined in claim 1 in which the maximum size of rock particles lies in the range four to twenty mesh, and the major portion finer than 100 mesh is removed prior to calcination.

3. A method as defined in claim 1 in which both magnesium and calcium carbonates are present in the rock feed and calcination is carried out at a temperature between 1150 and 1550° F.

4. A method as defined in claim 1 in which magnesite and dolomite are present and the temperature is maintained between 1150 and 1325° F. so as to decompose substantially all of the magnesite but no substantial part of the dolomite.

5. A method as defined in claim 1 in which magnesite and dolomite are present and the temperature is maintained between 1350 and 1450° F. so as to decompose substantially all of the magnesite and magnesium carbonate constituent of the dolomite but no substantial part of the calcium carbonate constituent of the dolomite.

6. A method as defined in claim 1 in which magnesite and a natural silicate are present in the rock feed, and calcination is carried out at a temperature between 1400 and 2000° F.

7. A method as defined in claim 1 in which the gas velocity immediately above the fluidized calcining bed, as calculated to a solid-free basis, is between 1.2 and 5.0 linear feet per second.

8. A method of obtaining magnesium oxide from natural rock containing an intimate mixture of magnesite, dolomite and a magnesium silicate, which comprises crushing the rock until it will substantially all pass a screen of ten meshes to the linear inch, removing therefrom substantially all particles finer than 0.01 inch, selectively calcining the granular rock at a temperature of 1350–1450° F. to decompose the magnesite and the magnesium carbonate constituent of the dolomite, but not the calcium carbonate constituent, thereby producing light, friable magnesia, but not more than about 1.0% of free lime, the while maintaining the material being calcined in a near-fluid state by passing gas upwardly between its particles at a rate of 1.7–2.4 linear feet per second when calculated to a solid-free condition, for the purpose of causing attrition and selectively reducing the friable magnesia to a fine, light powder, and thereby also selectively lifting said fine, light powder in the gas stream and conveying it therein to a collector, collecting the magnesia so conveyed as a dust substantially all finer than 0.01 inch, leaving behind in the calcining zone the coarser and heavier impurities, and removing these by gravity from the calcining zone as a separate product.

References Cited in the file of this patent

UNITED STATES PATENTS

| Number | Name | Date |
|---|---|---|
| 1,238,147 | Jesser | Aug. 28, 1917 |
| 1,273,110 | Mitchell | July 16, 1918 |
| 1,495,813 | Shaw | May 27, 1924 |
| 1,984,380 | Odell | Dec. 18, 1934 |
| 2,155,139 | MacIntire | Apr. 18, 1939 |
| 2,498,710 | Roetheli | Feb. 28, 1950 |
| 2,548,642 | White | Apr. 10, 1951 |

FOREIGN PATENTS

| Number | Country | Date |
|---|---|---|
| 580,367 | Great Britain | Sept. 5, 1946 |

OTHER REFERENCES

Kalbach, "Improving Solids-Gas Contacting by Fluidization," June 1944, Chem. and Met. Eng., pages 94–98.

Kalbach, "Fluidization in Chem. Reactions," Chem. Eng., Jan. 1947, pages 105–108.

Kidoo, "Flow in Fluidized Reaction Systems," May 1949, Chem. Engineering, pages 112/114.